United States Patent
Jousselin

(10) Patent No.: US 10,156,440 B2
(45) Date of Patent: Dec. 18, 2018

(54) BLADE TIP TIMING

(71) Applicant: ROLLS-ROYCE PLC, London (GB)

(72) Inventor: Olivier Y J P Jousselin, Bristol (GB)

(73) Assignee: ROLLS-ROYCE plc, London (GB)

( * ) Notice: Subject to any disclaimer, the term of this patent is extended or adjusted under 35 U.S.C. 154(b) by 909 days.

(21) Appl. No.: 14/225,048

(22) Filed: Mar. 25, 2014

(65) Prior Publication Data

US 2014/0365166 A1 Dec. 11, 2014

(30) Foreign Application Priority Data

May 30, 2013 (GB) .................................. 1309624.3

(51) Int. Cl.
*G01C 9/00* (2006.01)
*G01B 21/16* (2006.01)
(Continued)

(52) U.S. Cl.
CPC ........... *G01B 21/16* (2013.01); *F01D 21/003* (2013.01); *G01M 15/14* (2013.01); *G01P 13/00* (2013.01);
(Continued)

(58) Field of Classification Search
CPC ........ G01B 21/16; G01M 15/14; G01P 13/00; F01D 21/003; F05D 2270/334; F05D 2270/821; G01H 1/006
(Continued)

(56) References Cited

U.S. PATENT DOCUMENTS 4,887,468 A * 12/1989 McKendree ........... G01H 1/006
 73/660
5,206,816 A * 4/1993 Hill ........................ G01H 1/006
 702/56
(Continued)

FOREIGN PATENT DOCUMENTS

EP 2 136 189 A2 12/2009
EP 2 369 314 A1 9/2011
EP 2532839 A2 12/2012

OTHER PUBLICATIONS

Nov. 12, 2014 Search Report issued in European Patent Application No. 14 16 1485.
(Continued)

*Primary Examiner* — Stephanie Bloss
(74) *Attorney, Agent, or Firm* — Oliff PLC

(57) ABSTRACT

A method of analysing blade tip displacements (dijk) derived from a rotor having an array of blades that rotate at a rotational speed ($\omega$). The blades are monitored by an array of stationary timing probes for at least two revolutions (j) of the rotor. Define asynchronous displacement (dijk_A) as a sum of a sinusoidal term (Va) and an offset per probe term (Oo). Define synchronous displacement (dijk_S) as a sum of a sinusoidal term (Vs) and a common offset term (Cc). Solve the asynchronous displacements (dijk_A) using the blade tip displacements (dijk) to give asynchronous amplitude (|a|), offset per probe (ok) and asynchronous residuals (rijk_A). Solve the synchronous displacements (dijk_S) using the blade tip displacements (dijk) to give synchronous amplitude (|s|), common offset (cj) and synchronous residuals (rijk_S).

15 Claims, 3 Drawing Sheets

(51) Int. Cl.
*F01D 21/00* (2006.01)
*G01M 15/14* (2006.01)
*G01P 13/00* (2006.01)
*G01H 1/00* (2006.01)

(52) U.S. Cl.
CPC .. *F05D 2270/334* (2013.01); *F05D 2270/821* (2013.01); *G01H 1/006* (2013.01)

(58) Field of Classification Search
USPC .......................................................... 702/150
See application file for complete search history.

(56) References Cited

U.S. PATENT DOCUMENTS

| | | | | |
|---|---|---|---|---|
| 6,584,849 B2* | 7/2003 | Loftus | ................ | F01D 21/003 73/659 |
| 8,457,909 B2* | 6/2013 | Russhard | ............... | G01H 1/006 702/179 |
| 9,217,662 B2* | 12/2015 | Saloio, Jr. | .............. | G01H 1/006 |
| 2008/0206057 A1 | 8/2008 | Twerdochlib | | |
| 2008/0295604 A1* | 12/2008 | Hoyte | ................... | G01M 13/00 73/760 |
| 2009/0078053 A1* | 3/2009 | Twerdochlib | .......... | G01H 1/006 73/661 |
| 2009/0314092 A1* | 12/2009 | Twerdochlib | .......... | G01H 1/006 73/659 |
| 2009/0319206 A1* | 12/2009 | Russhard | ............... | G01H 1/006 702/56 |
| 2010/0116044 A1* | 5/2010 | Mitaritonna | ........... | G01H 1/006 73/147 |
| 2010/0153031 A1* | 6/2010 | Russhard | ............... | G01H 1/006 702/56 |

OTHER PUBLICATIONS

British Search Report issued in British Patent Application No. GB1309624.3 dated Jan. 10, 2014.

* cited by examiner

BLADE TIP TIMING

The present invention relates to a method of analysing blade tip displacements. It finds particular, although not exclusive, application for analysing blade tip displacements derived from a gas turbine engine rotor stage.

BACKGROUND

Known methods of analysing blade tip displacements do not extract the steady state displacement errors or noise from the data very well. Such errors increase measurement uncertainty and therefore decrease the veracity of the analysed displacements.

It is known to zero the blade tip displacement data in an attempt to extract the steady state displacement errors. However, such techniques often require many revolutions of the blades past the probes, for example thirty or forty revolutions, which makes them unsuitable for real-time applications. Other such techniques require expert manual intervention to define 'windows' in the data or are prone to distort the data by inaccurate definition of such windows.

SUMMARY

The present invention provides a method of analysing blade tip displacements that seeks to address the aforementioned problems.

Accordingly the present invention provides a method of analysing blade tip displacements, wherein the displacements are derived from a rotor having an array of blades that rotate at a rotational speed, the blades monitored by an array of stationary timing probes for at least two revolutions of the rotor; the method comprising steps for each blade to:
 a) define asynchronous displacement as a sum of a sinusoidal term and an offset per probe term;
 b) define synchronous displacement as a sum of a sinusoidal term and a common offset term;
 c) solve the asynchronous displacements using the blade tip displacements to give asynchronous amplitude, offset per probe and asynchronous residuals; and
 d) solve the synchronous displacements using the blade tip displacements to give synchronous amplitude, common offset and synchronous residuals.

The method analyses both synchronous and asynchronous responses to give the amplitudes, probe offsets, revolution offsets and residuals. Advantageously, there is no need to zero the displacement data prior to use of the method which removes that source of uncertainty in the analysis. Only two revolutions are required, although more may be used, to do the analysis so the method is substantially quicker than known methods.

Step c) may comprise best fitting a sine wave to the displacements. Step d) may comprise best fitting a sine wave to the displacements. The best fitting may comprise iteratively choosing an engine order, solving the displacements and comparing the residuals with previous solutions.

Step c) may comprise writing the asynchronous displacements in matrix form and performing singular value decomposition. Step d) may comprise writing the synchronous displacements in matrix form and performing singular value decomposition. Advantageously this is an efficient solution method.

Each sinusoidal term may comprise a sum of a first constant multiplied by a sine term and a second constant multiplied by a cosine term. The sine term and the cosine term may each have an argument being corrected probe angle multiplied by targeted engine order. The corrected probe angle may be the angular position of the probe corrected for offset between measured rotations. Advantageously this has the effect of plotting the probe positions from two or more revolutions on a single sine wave.

The method may comprise a step before step a) to target an engine order. The method may further comprise a step after step d) to increment the targeted engine order and then to iterate the steps of the method. Advantageously this enables convergence towards the best fit sine wave in a systematic method. The targeted engine order may be iterated within a range. The range may be predefined, for example 0.1 EO to 30 EO.

The asynchronous residuals and synchronous residuals may be used to determine measurement uncertainty and noise. Beneficially the uncertainty and noise may be determined using a statistical technique such as confidence intervals or Student's t-distributions.

The method may be repeated for each predetermined vibration mode. Advantageously the same blade tip displacement data is used.

The method may be repeated for each feature comprised in the array. The method may be performed in parallel for at least two of the features comprised in the array. Advantageously this enables the method to be performed substantially in real time. The method may, therefore, be used for real time monitoring of the rotor from which the displacement data is derived.

The present invention also provides a computer program having instructions adapted to carry out the method described: a computer readable medium, having a computer program recorded thereon, wherein the computer program is adapted to make the computer execute the method described; and a computer program comprising the computer readable medium.

The present invention also comprises a displacement system comprising: a rotor having an array of rotor blades, the rotor rotates at a rotational speed; an array of stationary timing probes arranged to measure the time at which each blade passes each probe for each of at least two revolutions of the rotor; a first processor configured to derive blade tip displacements from the measured times of arrival; and a second processor configured to perform the method as described. Preferably all the parts of the displacement system may be commonly located, for example in a gas turbine engine. Advantageously, the method may then be performed in real time. Alternatively the processor may be located remotely to the rotor and probes. Advantageously, the method may then be performed for offline analysis of the displacement data.

The stationary timing probes may be optical. The first and second processors may be separate functions of a common processor.

The present invention also provides a gas turbine engine comprising the displacement system described. The rotor may comprise one of the group comprising: a compressor rotor; a fan; and a turbine rotor.

Any combination of the optional features is encompassed within the scope of the invention except where mutually exclusive.

BRIEF DESCRIPTION OF THE DRAWING

The present invention will be more fully described by way of example with reference to the accompanying drawings, in which.

DETAILED DESCRIPTION

Figure 1:
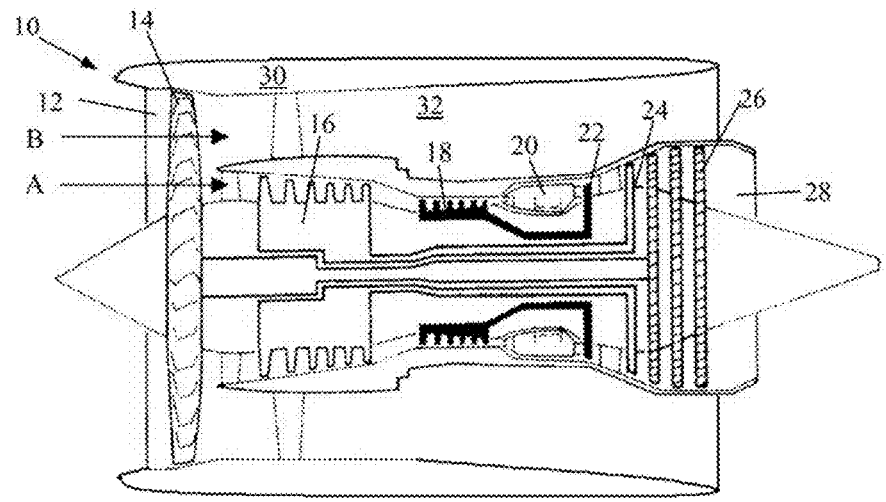
FIG. 1 is a sectional side view of a gas turbine engine.

A gas turbine engine 10 is shown in FIG. 1 and comprises an air intake 12 and a propulsive fan 14 that generates two airflows A and B. The gas turbine engine 10 comprises, in axial flow A, an intermediate pressure compressor 16, a high pressure compressor 18, a combustor 20, a high pressure turbine 22, an intermediate pressure turbine 24, a low pressure turbine 26 and an exhaust nozzle 28. A nacelle 30 surrounds the gas turbine engine 10 and defines, in axial flow B, a bypass duct 32.

Figure 2:
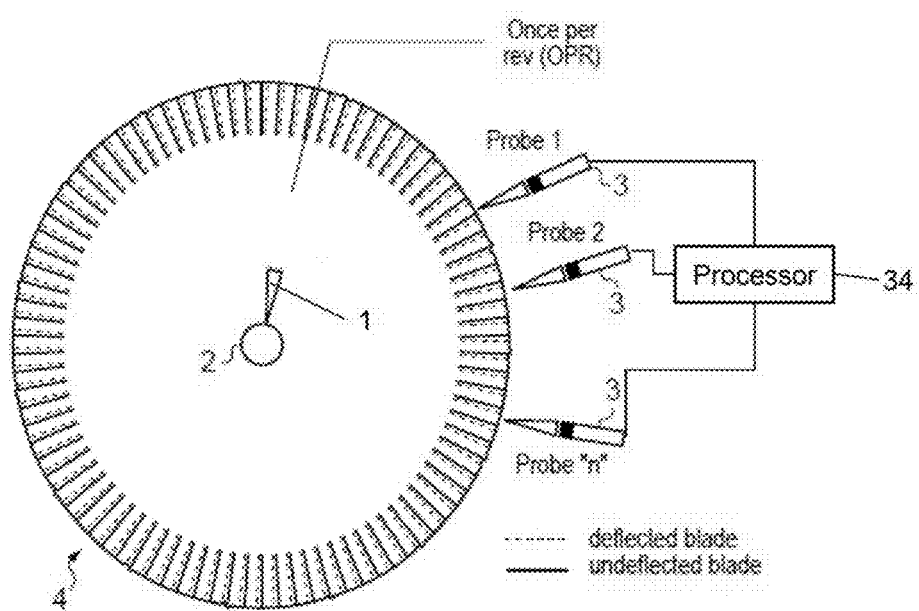
FIG. 2 is a schematic drawing of a blade tip timing arrangement.

FIG. 2 shows schematically a blade tip timing (BTT) arrangement. A once per revolution feature 1 is provided on the rotor 2. BTT probes 3 are mounted to a casing (not shown) and provide time of arrival measurements of the blades 4 mounted to the rotor 2. For example, the rotor 2 and blades 4 arrangement may be one of the stages of the low pressure, intermediate pressure or high pressure turbine 22, 24, 26 which rotates at rotational speed $\omega$. The probes 3 are coupled to a processor 34 and pass the time of arrival measurements thereto.

In an embodiment of the present invention there is an array of eight BTT probes $P_k$ ($P_1$, $P_2$ ... $P_8$) which are positioned at probe angles $\theta_k$, where k is the probe number, around at least some of the circumference of the casing. The probes 3 may be unequally spaced around the circumference of the casing, so that the angular distance between any adjacent pair of probes 3 is not the same as the angular distance between any other adjacent pair of probes 3. Advantageously, this enables different vibration modes to be detected.

The rotor 2 and/or the blades 4 experience vibration. The vibration may be synchronous, that is it comprises a frequency that is an integer multiple of the rotor speed $\omega$, or asynchronous, that is it comprises a frequency that is a non-integer multiple of the rotor speed $\omega$. Synchronous vibration may be caused by mechanical excitation, whereas asynchronous vibration is caused by non-mechanical excitation such as acoustic noise, rotating stall or blade flutter.

The probes 3 measure the time of arrival $t_{ijk}$ of each blade 4, where i is the blade number, j is the revolution number and k is the probe number. The times of arrival $t_{ijk}$ can be converted to blade tip displacements $d_{ijk}$ by multiplying the times of arrival $t_{ijk}$ by the rotational speed $\omega$ of the rotor 2 and the radial distance between the rotor axis and the tip of the blade 4.

The present invention comprises a method of analysing the blade tip displacements $d_{ijk}$ measured for at least two revolutions of the rotor 2. The method comprises analysing the synchronous and asynchronous vibrations separately. For simplicity the method is described with reference to the first blade, that is i=1, and using the first two revolutions of the rotor 2, that is j=1 and j=2.

For the asynchronous vibrations, a set of asynchronous displacements $d_{ijk\_A}$ is defined as the sum of a sinusoidal term and an offset per probe term. That is $d_{ijk\_A} = A_1 \sin(F_{eo}\theta_{jk}) + A_2 \cos(F_{eo}\theta_{jk}) + o_k$ where $A_1$ and $A_2$ are constants from which the amplitude and phase of a fitted sine wave can be calculated, $F_{eo}$ is a targeted engine order, $\theta_{jk}$ is a corrected probe angle and $o_k$ is the offset at each probe 3.

Similarly, for the synchronous vibrations, a set of synchronous displacements $d_{ijk\_S}$ is defined as the sum of a sinusoidal term and a common offset term. That is $d_{ijk\_S} = S_1 \sin(F_{eo}\theta_{jk}) + S_2 \cos(F_{eo}\theta_{jk}) + c_j$ where $S_1$ and $S_2$ are constants from which the amplitude and phase of a fitted sine wave can be calculated, $F_{eo}$ is the targeted engine order, $\theta_{jk}$ is the corrected probe angle and $c_j$ is the common offset for each revolution of the rotor 2.

The blade tip displacements $d_{ijk}$ can therefore be analysed as the sum of the asynchronous displacements $d_{ijk\_A}$ and asynchronous residuals $r_{ijk\_A}$. In the alternative, the blade tip displacements $d_{ijk}$ can be analysed as the sum of the synchronous displacements $d_{ijk\_S}$ and synchronous residuals $r_{ijk\_S}$. The asynchronous residuals $r_{ijk\_A}$ and synchronous residuals $r_{ijk\_S}$ indicate the measurement uncertainty and noise in the blade tip displacements $d_{ijk}$.

The asynchronous displacements $d_{ijk\_A}$ can be written in matrix form as $$\underline{d_a} = \underline{V}\underline{a} + \underline{O}\underline{o} \text{ where}$$

$$\underline{d_A} = \begin{bmatrix} d_{111\_A} \\ \vdots \\ d_{ijk\_A} \end{bmatrix}, \underline{o} = \begin{bmatrix} o_1 \\ \vdots \\ o_k \end{bmatrix}, \underline{a} = \begin{bmatrix} A_1 \\ A_2 \end{bmatrix},$$

the sinusoidal matrix is $$\underline{V} = \begin{bmatrix} \sin(F_{eo}\theta_{11}) & \cos(F_{eo}\theta_{11}) \\ \vdots & \vdots \\ \sin(F_{eo}\theta_{1k}) & \cos(F_{eo}\theta_{1k}) \\ \vdots & \vdots \\ \sin(F_{eo}\theta_{j1}) & \cos(F_{eo}\theta_{j1}) \\ \vdots & \vdots \\ \sin(F_{eo}\theta_{jk}) & \cos(F_{eo}\theta_{jk}) \end{bmatrix}$$

and the offset matrix is $$\underline{O} = \begin{bmatrix} 1 & 0 & \cdots & 0 \\ 0 & 1 & \cdots & 0 \\ \vdots & \vdots & \ddots & \vdots \\ 0 & 0 & \cdots & 1 \\ \vdots & \vdots & \vdots & \vdots \\ 1 & 0 & \cdots & 0 \\ 0 & 1 & \cdots & 0 \\ \vdots & \vdots & \ddots & \vdots \\ 0 & 0 & \cdots & 1 \end{bmatrix}.$$

The offset matrix $\underline{O}$ has a column for each probe 3 so there are k columns. It has a row for each probe 3 at each revolution of the rotor 2 so there are (j*k) rows. The offset matrix $\underline{O}$ comprises an identity matrix forming the first k rows, another identity matrix forming the next k rows and so on, so that there are j identity matrices stacked vertically.

Figures 3, 4:
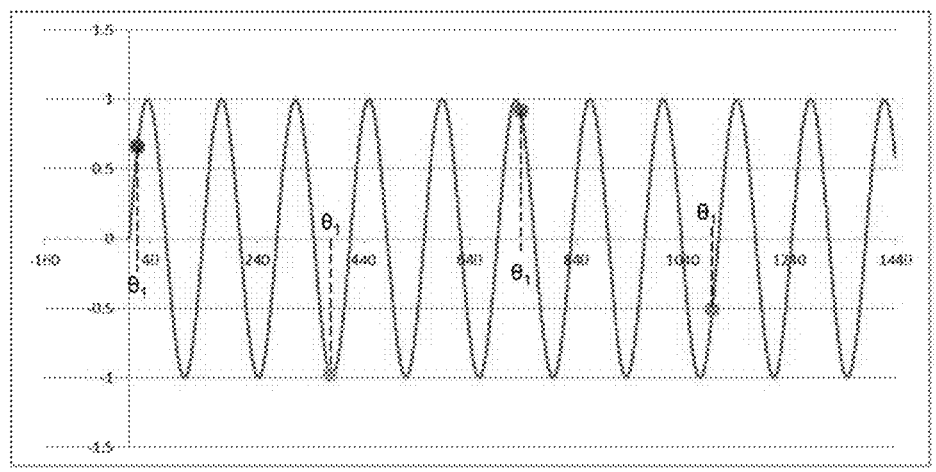
FIG. 3 is a fitted sine wave showing blade tip measurements at a probe angle over four revolutions for one probe.
FIG. 4 is a fitted sine wave showing blade tip displacements at corrected probe angles for one probe.

The corrected probe angle $\theta_{jk}$ is the probe angle $\theta_k$ with 360° added for each revolution. An offset is then added which is dependent on $F_{eo}$ and takes into account that any one of the probes 3 does not measurement the same point on a fitted sine wave in successive revolutions for asynchronous vibration responses. FIG. 3 is an exemplary fitted sine wave for targeted engine order $F_{eo}=2.6$ showing the measurement of a probe $P_1$ located at probe angle $\theta_1=16.0°$ in four successive revolutions j of the rotor 2. The blade tip displacements $d_{1j1}$ are 0.66, −0.98, 0.92 and −0.51 for j=1 . . . 4. FIG. 4 shows the corrected probe angles $\theta_{j1}$ to obtain the same blade tip displacements $d_{ijk}$ but plotted onto the first revolution j=1. The corrected probe angles $\theta_{j1}$ are then 16.0°, 99.1°, 182.2° and 265.2° for j=1 . . . 4. Only one probe $P_1$ is shown in FIG. 3 and FIG. 4 for clarity.

A best fit sine wave can be fitted to the blade tip displacements $d_{ijk}$ measured by the probes 3. First a targeted engine order $F_{eo}$ is selected from within a range of engine orders of interest. Then the corrected probe angles $\theta_{jk}$ are calculated. The blade tip displacements $d_{ijk}$ are set approximately equal to the right-hand side of the asynchronous equation, thus $d_{ijk} \cong A_1 \sin(F_{eo}\theta_{jk}) + A_2 \cos(F_{eo}\theta_{jk}) + o_k$. The set of equations are solved for the unknowns $A_1$, $A_2$ and each $o_k$. Preferably the approximate equality is written in matrix form and solved using singular value decomposition, but alternatively simultaneous equations or other known methods can be used.

The amplitude $|a|$ of the best fit sine wave is $\sqrt{A_1^2 + A_2^2}$. Its phase, in radians, is $\tan^{-1}(A_2/A_1)$.

The asynchronous displacements $d_{ijk\_A}$ are then calculated using the equation $A_1 \sin(F_{eo}\theta_{jk}) + A_2 \cos(F_{eo}\theta_{jk}) + o_k = d_{ijk\_A}$. The asynchronous residuals $r_{ijk\_A}$ are the difference between the measured blade tip displacements $d_{ijk}$ and the calculated asynchronous displacements $d_{ijk\_A}$. Thus the asynchronous residuals $r_{ijk\_A}$ give an indication of the measurement uncertainty and noise inherent in the measured blade tip displacements $d_{ijk}$.

Practical embodiments of the method of the present invention iterate the approximation, solution and residual calculation steps. Thus a first targeted engine order $F_{eo}$ is chosen within a predefined range. The corrected probe angles $\theta_{jk}$ are calculated and the measured blade tip displacements $d_{ijk}$ are approximated to the asynchronous expression using this $F_{eo}$ and resulting corrected probe angles $\theta_{ijk}$. The asynchronous displacements $d_{ijk\_A}$ are then calculated and the asynchronous residuals $r_{ijk\_A}$ determined from the difference between measured blade tip displacements $d_{ijk}$ and asynchronous displacements $d_{ijk\_A}$. Then the targeted engine order $F_{eo}$ is incremented within the range by a predetermined increment amount and the approximation, solution and residual calculation steps repeated. If the asynchronous residuals $r_{ijk\_A}$ now calculated are smaller than those calculated in the previous iteration, the current iteration has found a better fit sine wave.

The iteration may continue through all targeted engine orders $F_{eo}$ within the predetermined range and then the targeted engine order $F_{eo}$ giving the minimum asynchronous residuals $r_{ijk\_A}$ be chosen, thereby guaranteeing the best fit sine wave. Alternatively, the iteration may compare the calculated asynchronous residuals $r_{ijk\_A}$ at each iteration with the previous iteration and retain the targeted engine order $F_{eo}$ giving the smaller asynchronous residuals $r_{ijk\_A}$. The iteration can then be continued until a targeted engine order $F_{eo}$ is found that produces asynchronous residuals $r_{ijk\_A}$ at or below a predetermined acceptability threshold.

Figure 5:
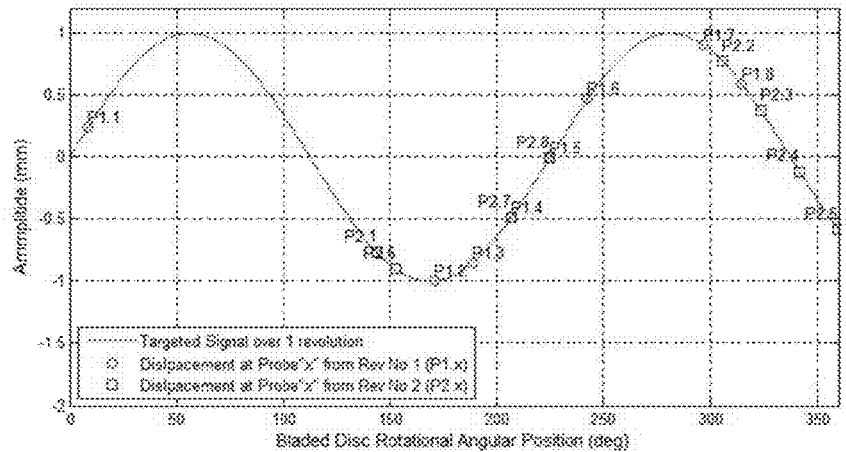
FIG. 5 is a fitted sine wave for asynchronous vibration.

FIG. 5 shows a best fit sine wave for blade tip displacements $d_{ijk}$ measured at eight probes $P_1 \ldots P_8$ over two revolutions j=1, 2 and plotted at the corrected probe angles $\theta_{jk}$ on one revolution.

Advantageously the method averages the steady state offset at each probe 3 over two revolutions of the rotor 2 and subtracts this from the measured amplitude of the blade tip displacements $d_{ijk}$. This removes the requirement to zero the data. The method is therefore more robust and quicker than previously known methods of analysing blade tip displacements $d_{ijk}$.

The synchronous displacements $d_{ijk\_S}$ can be written in matrix form as $$\underline{d_S} = \underline{V}\underline{s} + \underline{C}\underline{c} \text{ where}$$

$$\underline{d_S} = \begin{bmatrix} d_{111\_S} \\ \vdots \\ d_{ijk\_S} \end{bmatrix}, \underline{c} = \begin{bmatrix} c_1 \\ \vdots \\ c_j \end{bmatrix}, \underline{s} = \begin{bmatrix} S_1 \\ S_2 \end{bmatrix},$$

the sinusoidal matrix $\underline{V}$ is the same as for the asynchronous displacements $d_{ijk\_A}$ and the common offset matrix is $$\underline{C} = \begin{bmatrix} 1 & 0 & \cdots & 0 \\ \vdots & \vdots & \ddots & \vdots \\ 1 & 0 & \cdots & 0 \\ 0 & 1 & \cdots & 0 \\ \vdots & \vdots & \ddots & \vdots \\ 0 & 1 & \cdots & 0 \\ \vdots & \vdots & \vdots & \vdots \\ 0 & 0 & \cdots & 1 \\ \vdots & \vdots & \ddots & \vdots \\ 0 & 0 & \cdots & 1 \end{bmatrix}.$$

The common offset matrix $\underline{C}$ has a column for each revolution so there are j columns. It has a row for each probe 3 at each revolution of the rotor 2 so there are (j*k) rows. The common offset matrix $\underline{C}$ has a one in the first column and zeroes elsewhere for the first k rows, a one in the second column and zeroes elsewhere for the second k rows and so on for j sets of k rows.

A best fit sine wave can be fitted to the blade tip displacements $d_{ijk}$ measured by the probes 3. First a targeted engine order $F_{eo}$ is selected from within a range of engine orders of interest. Then the corrected probe angles $\theta_{jk}$ are calculated. The blade tip displacements $d_{ijk}$ are set approximately equal to the right-hand side of the synchronous equation, thus $d_{ijk} \cong S_1 \sin(F_{eo}\theta_{jk}) + S_2 \cos(F_{eo}\theta_{jk}) + c_j$. The set of equations are solved for the unknowns $A_1$, $A_2$ and each $c_j$. Preferably the approximate equality is written in matrix form and solved using singular value decomposition, but alternatively simultaneous equations or other known methods can be used.

The amplitude $|s|$ of the best fit sine wave is $\sqrt{S_1^2 + S_2^2}$. Its phase, in radians, is $\tan^{-1}(S_2/S_1)$.

The synchronous displacements $d_{ijk\_S}$ are then calculated using the equation $S_1 \sin(F_{eo}\theta_{jk}) + S_2 \cos(F_{eo}\theta_{jk}) + c_j = d_{ijk\_S}$. The synchronous residuals $r_{ijk\_S}$ are the difference between the measured blade tip displacements $d_{ijk}$ and the calculated synchronous displacements $d_{ijk\_S}$. Thus the synchronous residuals $r_{ijk\_S}$ give an indication of the measurement uncertainty and noise inherent in the measured blade tip displacements $d_{ijk}$.

Figure 6:
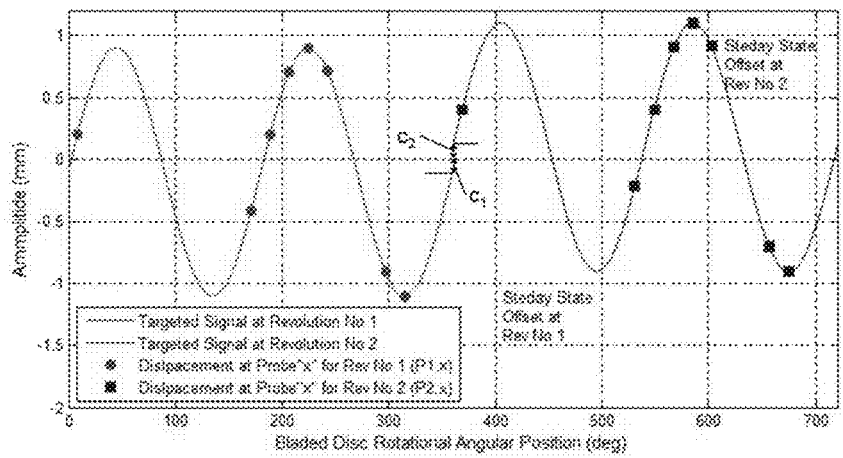
FIG. 6 is a fitted sine wave over two revolutions for synchronous vibration.

The common offset $c_j$ for each revolution j of the rotor 2 indicates the amount by which the best fit sine wave must be shifted vertically for that revolution in order to be centred about zero. FIG. 6 shows the best fit sine waves for two consecutive revolutions of the rotor 2. The common offset $c_1$, $c_2$ for each of the revolutions, which is the mean DC offset of the blade tip displacements $d_{ijk}$, is indicated. Thus the common offset $c_j$ is equivalent to the steady state offset but is recalculated for each revolution of the rotor 2 using data from that revolution and at least one other revolution. The change in steady state offset between revolutions is caused by changes in the blade loading, for example due to axial shift, blade untwist and radial growth.

Advantageously the method of the present invention successfully analyses synchronous vibration which previously manifested as a slow change in steady state blade tip displacement $d_{ijk}$, thereby distorting the analysis.

Thus the method comprises approximating the blade tip displacements $d_{ijk}$ by an expression of asynchronous displacement $d_{ijk\_A}$ and, separately, an expression of synchronous displacement $d_{ijk\_S}$, and solving each of the asynchronous displacements $d_{ijk\_A}$ and synchronous displacements $d_{ijk\_S}$ using the measured blade tip displacements $d_{ijk}$ to give the amplitude of the best fit sine wave, the offset per probe $o_k$, the common offset per revolution $c_j$, the asynchronous residuals $r_{ijk\_A}$ and the synchronous residuals $r_{ijk\_S}$.

The method may be iterated for each vibration mode. Each vibration mode may have a different range of targeted engine orders $F_{eo}$ associated with it.

The method may be used to analyse multiple asynchronous responses by setting the sinusoidal term to be the sum of a sine and a cosine term for each targeted engine order $F_{eo\_r}$, where r is the frequency response number. Similarly the method may be used to analyse multiple synchronous responses by setting the sinusoidal term to be the sum of a sine and a cosine term for each targeted engine order $F_{eo\_r}$. The sinusoidal matrix $\underline{V}$ is therefore rewritten as $$\underline{V} = \begin{bmatrix} \sin(F_{eo\_1}\theta_{11}) & \cos(F_{eo\_1}\theta_{11}) & \ldots & \sin(F_{eo\_r}\theta_{11}) & \cos(F_{eo\_r}\theta_{11}) \\ \vdots & \vdots & \vdots & \vdots & \vdots \\ \sin(F_{eo\_1}\theta_{1k}) & \cos(F_{eo\_1}\theta_{1k}) & \ldots & \sin(F_{eo\_r}\theta_{1k}) & \cos(F_{eo\_r}\theta_{1k}) \\ \vdots & \vdots & \vdots & \vdots & \vdots \\ \sin(F_{eo\_1}\theta_{j1}) & \cos(F_{eo\_1}\theta_{j1}) & \ldots & \sin(F_{eo\_r}\theta_{j1}) & \cos(F_{eo\_r}\theta_{j1}) \\ \vdots & \vdots & \vdots & \vdots & \vdots \\ \sin(F_{eo\_1}\theta_{jk}) & \cos(F_{eo\_1}\theta_{jk}) & \ldots & \sin(F_{eo\_r}\theta_{jk}) & \cos(F_{eo\_r}\theta_{jk}) \end{bmatrix}$$

The method is unchanged by the generalisation of the sinusoidal matrix $\underline{V}$ because none of the offset matrix $\underline{O}$, common offset matrix $\underline{C}$ offsets per probe $o_k$ or common offsets per revolution $c_j$ are affected. There will be pairs of constants $A_1, A_2, S_1, S_2$ for each targeted engine order $F_{eo\_r}$, from which the amplitude and phase of the fitted sine wave can be determined.

The asynchronous residuals $r_{ijk\_A}$ and synchronous residuals $r_{ijk\_S}$ are related to each other. They can therefore be combined in a defined function to give overall residuals $r_{ijk}$. The systematic measurement uncertainty can be determined using a statistical method of assessing confidence intervals such as the Student's t-distribution. First the standard deviation $\sigma$ of the residuals $r_{ijk}$ is calculated, and the desired confidence level t, for example 90%, set. The measurement uncertainty for the asynchronous and synchronous responses respectively are then $$\pm \frac{t\sigma}{\sqrt{N}\sqrt{A_1^2 + A_2^2}} \text{ and } \pm \frac{t\sigma}{\sqrt{N}\sqrt{S_1^2 + S_2^2}},$$

where N is the number of residuals $r_{ijk}$.

The overall measurement uncertainty is calculated in the same manner but with a different, higher, confidence level. For example, the overall measurement uncertainty may be calculated with a t=99.9%.

Noise in the blade tip displacement data manifests as random error. The random error is equal to the square root of the overall measurement uncertainty squared minus the systematic measurement uncertainty squared. Mathematically that is $\sqrt{\text{Overall}^2 - \text{Systematic}^2}$.

The signal to noise ratio for a given frequency response number r is proportional to the common logarithm (to the base ten) of the square root of the extracted blade tip amplitude divided by the random error. Mathematically that is $$\frac{|a|}{\text{Random}}$$

for the asynchronous response and $$\frac{|s|}{\text{Random}}$$

for the synchronous response.

The method of the present invention is preferably encompassed in computer-implemented code and stored on a computer-readable medium. It is thus a computer-implemented method of analysing blade tip displacements. The method may be implemented on a basic computer system comprising a processing unit, memory, user interface means such as a keyboard and/or mouse, and display means. The method may be performed 'offline' on data which has been measured and recorded previously. Alternatively it may be performed in 'real-time', that is at the same time that the data is measured. In this case the computer may be coupled to the displacement system. Where the displacement system forms part of a gas turbine engine 10 the computer may be an electronic engine controller or another on-board processor. Where the gas turbine engine 10 powers an aircraft, the computer may be an engine controller, a processor on-board the engine 10 or a processor on-board the aircraft.

Although the method has been described as plotting subsequent revolutions onto the first revolution, one or more earlier revolution may instead be plotted onto a later revolution. The first revolution used in the calculations need not be the first revolution of the rotor 2.

Preferably consecutive revolutions j of the rotor 2 are used in the method but alternatively a different pair of revolutions, for example alternate revolutions, may be used. Advantageously, the method is effective for real-time analysis of blade tip displacements $d_{ijk}$ because only two revolutions of the rotor 2 are required, instead of the tens of revolutions averaged by previous methods.

Preferably the method of the present invention is repeated for each blade 4 in the array of blades 4 that form the rotor 2. Preferably the method is performed in parallel for at least two of the blades 4 in the array. Where the processor 34 on which the method is performed is a computer this is a simple matter. For example, the time of arrival measurements at each probe 3 for each of the blades 4 forming the array of blades 4 can be recorded in a multi-dimensional matrix. The necessary data can then be extracted by the processor 34 to perform the method for each blade 4. Alternatively the method may be performed in series for at least two of the blades 4 in the array.

Although the method steps have been described in a particular order, some of the steps may be performed in a different order. For example the asynchronous displacement may be defined and solved and then the synchronous displacement be defined and solved; the synchronous displacement may be defined and solved before the asynchronous displacement is defined and solved; or the synchronous displacement may be defined, then the asynchronous displacement be defined, and then each be solved in either order.

Although the method has been described using two revolutions of the rotor 2, this is the minimum number of revolutions required. In some applications of the method it may be preferable to use blade tip displacements $d_{ijk}$ from three or more revolutions. However, the method is only robust where the rotational speed ω of the rotor 2 is substantially unchanged between revolutions. Otherwise, the calculated uncertainties will be substantially larger. The likelihood of a significant change in rotational speed ω between the first and last used revolutions increases with more than two revolutions so that a preliminary step of checking the rotational speed ω may be required if blade tip displacements $d_{ijk}$ from more than two revolutions are to be used in the method.

The present invention also provides a blade tip displacement system comprising the rotor 2 having the array of blades 4 that rotate at a rotational speed. The system includes the probes 3 that are equally or irregularly spaced circumferentially around part or the whole circumference of a rotor casing. The probes 3 are arranged to measure the arrival time of each blade tip and to pass the measurements to a processor 34. The processor 34 is configured to perform the method of the present invention.

The invention claimed is:

1. A method of analysing blade tip displacements (dijk) from a rotor having an array of blades that rotate at a rotational speed (ω), the method comprising steps for each blade to:
   a) measure the displacements (dijk) from the rotor having the array of blades, the blades monitored by an array of stationary timing probes for at least two revolutions (j) of the rotor;
   b) define asynchronous displacement (dijk_A) as a sum of a sinusoidal term (Va) and an offset at each probe (Oo);
   c) define synchronous displacement (dijk_S) as a sum of a sinusoidal term (Vs) and a common offset for each revolution of the rotor (Cc);
   d) solve the asynchronous displacements (dijk_A) using the blade tip displacements (dijk) to give asynchronous amplitude (|a|), offset per probe (ok) and asynchronous residuals (rijk_A), in which the asynchronous residuals (rijk_A) are a difference between the measured tip displacements (dijk) and the calculated asynchronous displacements (dijk_A);
   e) solve the synchronous displacements (dijk_S) using the blade tip displacements (dijk) to give synchronous amplitude (|s|), common offset (cj) and synchronous residuals (rijk_S), in which the synchronous residuals (rijk_S) are a difference between the measured tip displacements (dijk) and the calculated synchronous displacements (dijk_S);
   f) determining measurement uncertainty and noise inherent in the measured blade tip displacements (dijk) by the asynchronous residuals (rijk_A) and synchronous residuals (rijk_S); and
   g) iterating steps (a)-(f) through all targeted engine orders (Feo) within a range and selecting the targeted engine order (Feo) with minimum asynchronous residuals and synchronous residuals, thereby guaranteeing a best fit sine wave.

2. The method as claimed in claim 1 wherein step d) comprises best fitting a sine wave to displacements (dijk).

3. The method as claimed in claim 1 wherein step e) comprises best fitting a sine wave to displacements (dijk).

4. The method as claimed in claim 1 wherein step d) comprises writing the asynchronous displacements (dijk_A) in matrix form and performing singular value decomposition.

5. The method as claimed in claim 1 wherein step e) comprises writing the synchronous displacements (dijk_S) in matrix form and performing singular value decomposition.

6. The method as claimed in claim 1 wherein each sinusoidal term (Va, Vs) is a sum of a first constant (A1, S1) multiplied by a sine term and a second constant (A2, S2) multiplied by a cosine term.

7. The method as claimed in claim 6 wherein the sine term and cosine term each has argument being corrected probe angle (θjk) multiplied by targeted engine order (Feo).

8. The method as claimed in claim 7 wherein the corrected probe angle (θjk) is the angular position of the probe corrected for offset between rotations.

9. The method as claimed in claim 1 further comprising a step before step b) to target an engine order (Feo).

10. The method as claimed in claim 9 further comprising a step after step e) to increment the targeted engine order (Feo).

11. The method as claimed in claim 1 wherein the method is performed for a predetermined number of vibration modes.

12. A non-transitory computer readable medium, having a computer program recorded thereon, wherein the computer program is adapted to make the computer execute the method according to claim 1.

13. A displacement system comprising:
   a rotor having an array of rotor blades, the rotor rotates at a rotational speed (ω);
   an array of stationary timing probes arranged to measure a time of arrival (tijk) at which each blade passes each probe for each of at least two revolutions of the rotor;
   a common processor or separate processors configured to (i) derive blade tip displacements (dijk) from the measured times of arrival (tijk), and (ii) perform the method as claimed in claim 1.

14. The system as claimed in claim 13 wherein the stationary timing probes are optical.

15. A gas turbine engine comprising the displacement system as claimed in claim 13 wherein the rotor comprises one of the group comprising: a compressor rotor; a fan; and a turbine rotor.

* * * * *